United States Patent
Harrington et al.

(10) Patent No.: US 7,266,658 B2
(45) Date of Patent: Sep. 4, 2007

(54) SYSTEM, METHOD, AND COMPUTER PROGRAM PRODUCT FOR PROHIBITING UNAUTHORIZED ACCESS TO PROTECTED MEMORY REGIONS

(75) Inventors: Bradley Ryan Harrington, Austin, TX (US); Kevin Brian Locke, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/242,746

(22) Filed: Sep. 12, 2002

(65) Prior Publication Data

US 2004/0064718 A1   Apr. 1, 2004

(51) Int. Cl.
G06F 12/14 (2006.01)

(52) U.S. Cl. ............... 711/163; 711/147; 711/152; 711/154; 711/170; 711/173; 713/164; 713/165; 713/166; 713/189; 713/193; 709/200

(58) Field of Classification Search ........... 711/163, 711/173, 147, 152, 154, 170; 713/164, 165, 713/166, 189, 193; 709/200
See application file for complete search history.

(56) References Cited

U.S. PATENT DOCUMENTS

| | | | |
|---|---|---|---|
| 4,621,321 A | 11/1986 | Boebert et al. | 364/200 |
| 4,918,653 A | 4/1990 | Johri et al. | 364/900 |
| 6,006,328 A | 12/1999 | Drake | 713/200 |
| 6,185,683 B1 | 2/2001 | Ginter et al. | 713/176 |
| 6,272,533 B1 | 8/2001 | Browne | 709/213 |
| 6,289,455 B1 | 9/2001 | Kocher et al. | 713/194 |
| 6,330,670 B1 | 12/2001 | England et al. | 713/2 |
| 6,360,244 B1 * | 3/2002 | Bharadhwaj | 718/108 |
| 6,802,029 B2 * | 10/2004 | Shen et al. | 714/38 |
| 6,820,164 B2 * | 11/2004 | Holm et al. | 710/312 |
| 6,986,052 B1 * | 1/2006 | Mittal | 713/190 |
| 2002/0129245 A1 * | 9/2002 | Cassagnol et al. | 713/168 |

(Continued)

FOREIGN PATENT DOCUMENTS

JP    09-160831    6/1997

(Continued)

OTHER PUBLICATIONS

Wiseman et al., "The Trusted Path between SMITE and the User", British Crown Copyright, 1988, IEEE Online Library, pp. 147-155.

(Continued)

*Primary Examiner*—Stephen C. Elmore
*Assistant Examiner*—Daniel Kim
(74) *Attorney, Agent, or Firm*—Duke W. Yee; Diana R. Gerhardt; Lisa L. B. Yociss

(57) ABSTRACT

A system, method, and computer program product are disclosed for prohibiting unauthorized access to a protected region of memory. A protected region of memory and a trusted region of memory are both specified. A call to access a location within the protected region of memory is received. An origination location of the call is then determined. In response to a determination that the origination location is within the trusted region, the call is permitted to access the protected region of memory. In response to a determination that the origination location is outside of the trusted region, the call is prohibited from accessing the protected region of memory.

36 Claims, 4 Drawing Sheets

U.S. PATENT DOCUMENTS

2003/0084346 A1* 5/2003 Kozuch et al. ............. 713/201

FOREIGN PATENT DOCUMENTS

| JP | H09-160831 | 6/1997 |
| JP | 09-311821 | 12/1997 |
| JP | H09-311821 | 12/1997 |
| JP | 10-228421 | 8/1998 |
| JP | H10-228421 | 8/1998 |
| JP | 2000-305841 | 11/2000 |

OTHER PUBLICATIONS

Gutzmann, "Access Control and Session Management in the HTTP Environment", IEEE Internet Computing, http://computer.org/internet/, Jan./Feb. 2001, pp. 26-35.

* cited by examiner

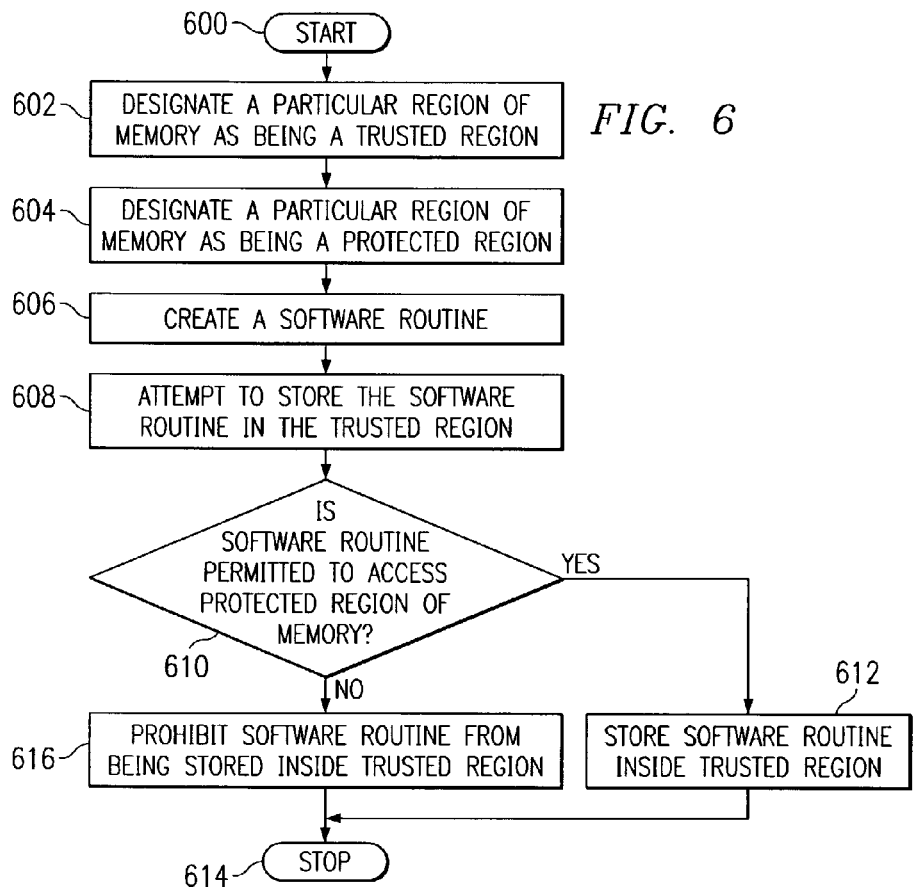
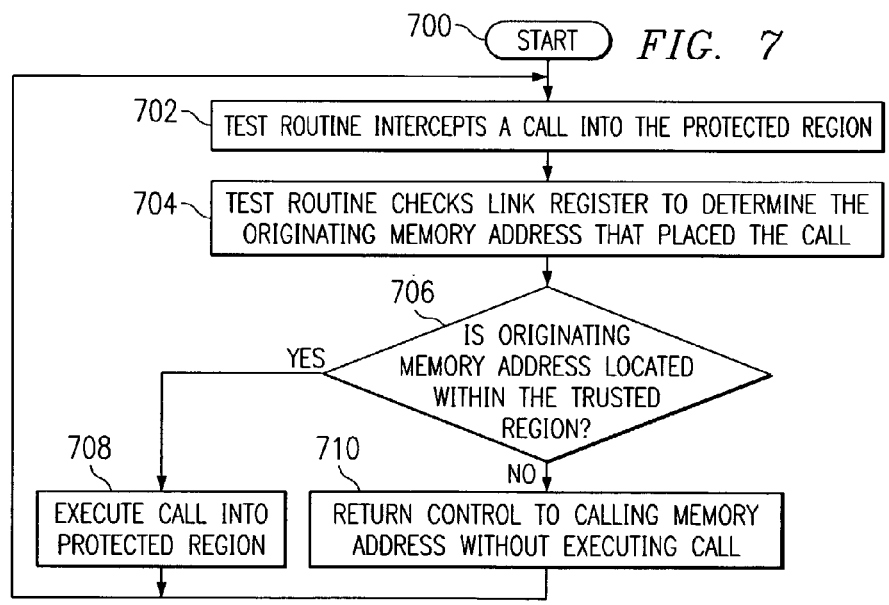

SYSTEM, METHOD, AND COMPUTER PROGRAM PRODUCT FOR PROHIBITING UNAUTHORIZED ACCESS TO PROTECTED MEMORY REGIONS

BACKGROUND OF THE INVENTION

1. Technical Field

The present invention relates generally to the field of computer systems and, more specifically to a system, method, and computer program product for prohibiting unauthorized access to a protected region of memory.

2. Description of Related Art

A logical partitioning option (LPAR) within a data processing system (platform) allows multiple copies of a single operating system (OS) or multiple heterogeneous operating systems to be simultaneously run on a single data processing system hardware platform. A partition, within which an operating system image runs, may be assigned a non-overlapping subset of the platform's hardware resources. In some implementations, a percentage of system resources is assigned such that system resources are essentially time-sliced across partitions. These platform allocable resources include one or more architecturally distinct processors with their interrupt management area, regions of system memory, and input/output (I/O) adapter bus slots. The partition's resources are represented by its own resources list typically created and maintained by the systems underlying firmware and available to the OS image.

Each distinct OS or image of an OS running within the platform is protected from each other such that software errors on one logical partition can not affect the correct operation of any of the other partitions. At a given time, this is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus at a given time, each image of the OS, or each different OS, directly controls a distinct set of allocable resources within the platform.

Many logically partitioned systems make use of a hypervisor. A hypervisor is a layer of privileged software between the hardware and logical partitions that manages and enforces partition protection boundaries. The hypervisor is also referred to as partition management firmware. The hypervisor is responsible for configuring, servicing, and running multiple logical systems on the same physical hardware. The hypervisor is typically responsible for allocating resources to a partition, installing an operating system in a partition, starting and stopping the operating system in a partition, dumping main storage of a partition, communicating between partitions, and providing other functions. In order to implement these functions, a hypervisor also has to implement its own low level operations like main storage management, synchronization primitives, I/O facilities, heap management, and other functions.

Accessing hypervisor functions included in the hypervisor code can change the functionality of the hypervisor code. Therefore, because the hypervisor supports all partitions, changing the functionality of the hypervisor will affect the entire system's stability.

Therefore, a need exists for a method, system, and product for prohibiting unauthorized access to a protected region of memory, such as the region where the hypervisor is stored, in order to protect a software routine stored in the protected region.

SUMMARY OF THE INVENTION

A system, method, and computer program product are disclosed for prohibiting unauthorized access to a protected region of memory. A protected region of memory and a trusted region of memory are both specified. A call to access a location within the protected region of memory is received. An origination location of the call is then determined. In response to a determination that the origination location is within the trusted region, the call is permitted to access the protected region of memory. In response to a determination that the origination location is outside of the trusted region, the call is prohibited from accessing the protected region of memory.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a high level flow chart which depicts storing software routines in a trusted region when the software routine is permitted to access a protected region within memory in accordance with the present invention; and FIG. 7 depicts a high level flow chart which illustrates executing calls into a protected region only when the call originates from a trusted region in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for prohibiting unauthorized access to a protected region of memory. A protected region of memory and a trusted region of memory are both specified. Calls made from the trusted region into the protected region will be permitted and executed. Rogue calls, i.e. calls from an area other than the trusted region, into the protected region will not be executed. These calls will be returned without being permitted to access the protected region.

The current value of a link register will be determined in order to determine the originating address of a call made to the protected region. If the current value of the link register falls within the trusted region, the call will be executed and permitted to access the protected region. If, however, the current value of the link register does not fall within the trusted region, the call will not be executed and will not be permitted to access the protected region.

Software that needs to be protected from rogue calls may be stored in the protected region. Software routines that may be permitted to access the protected software must be stored in the trusted region in order to gain access to the protected software. For example, hypervisor code may be stored in the protected region. Only the software code that is stored in the trusted region may access the hypervisor code. In this manner the hypervisor code will be protected.

Figure 1:
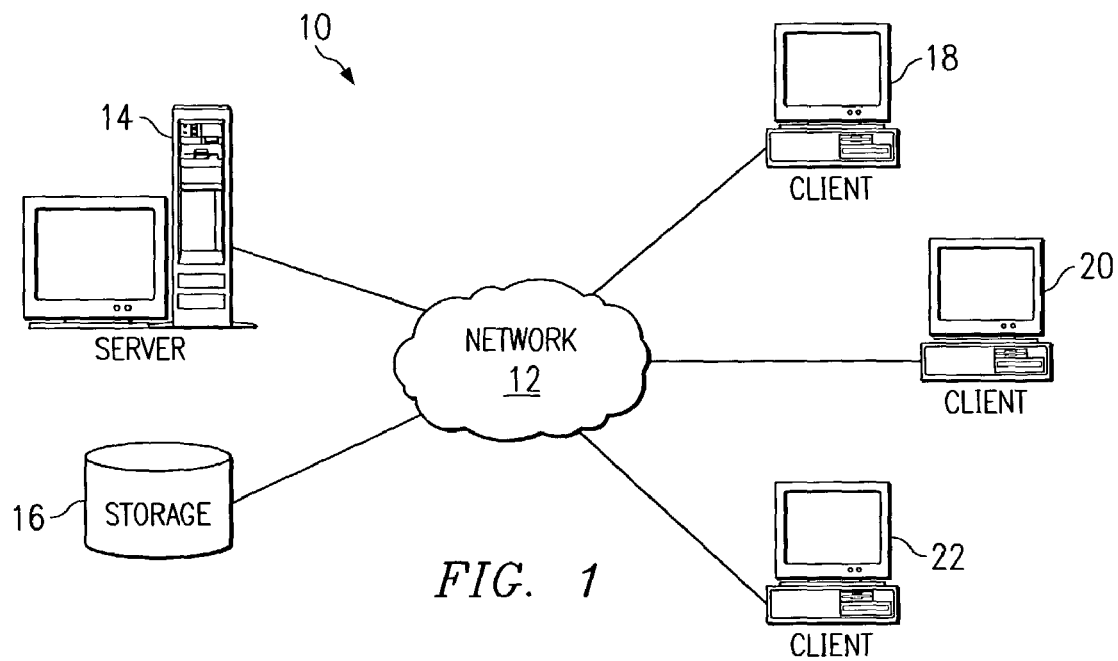
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18-22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
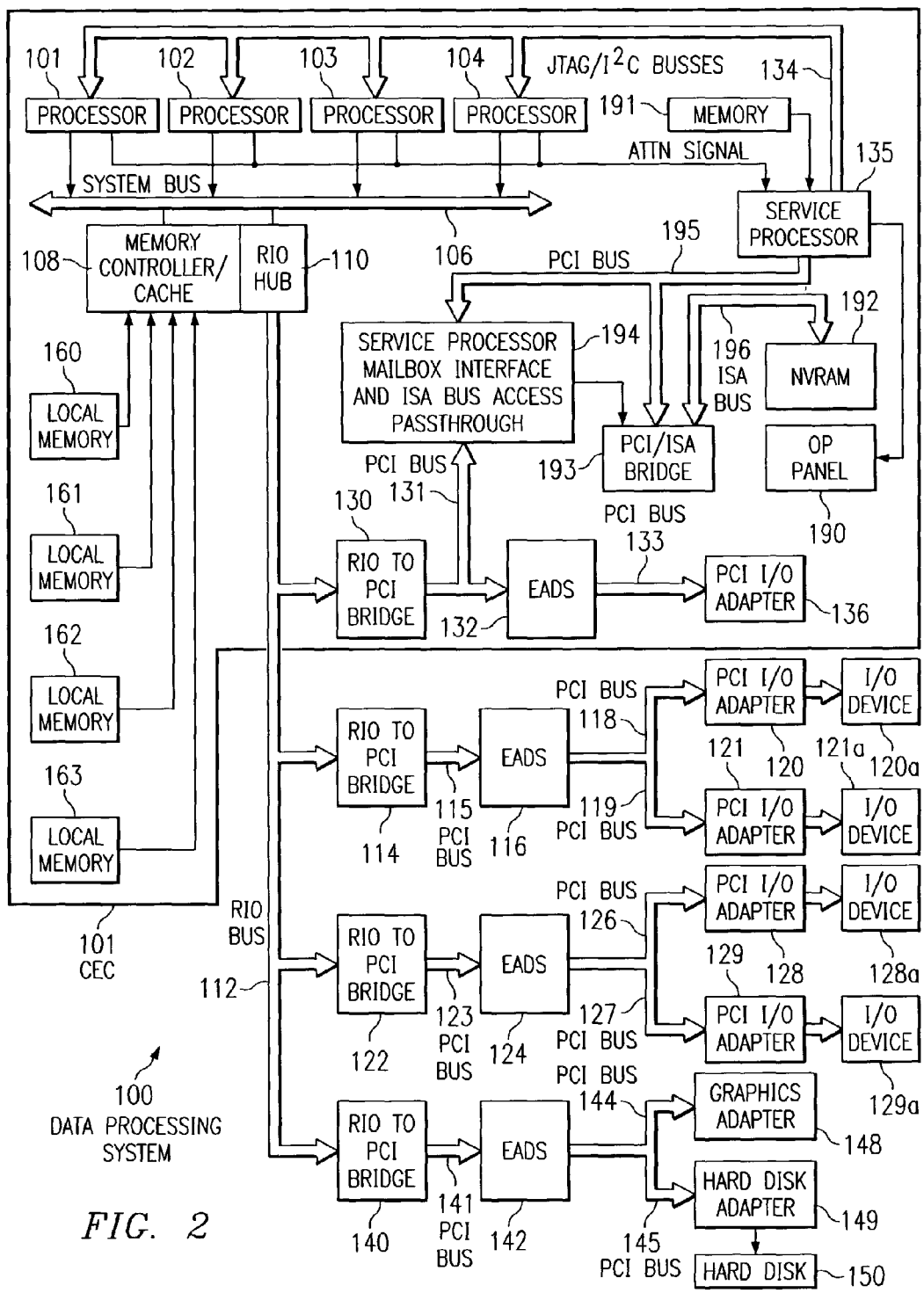
FIG. 2 is a more detailed block diagram of a data processing system in which the present invention may be implemented in accordance with the present invention.

FIG. 2 is a more detailed block diagram of a data processing system in which the present invention may be implemented. Data processing system 100 is a logically partitioned system. Data processing system 100 includes a central electronic complex 101 which includes logically partitioned hardware. CEC 101 includes a plurality of processors 101, 102, 103, and 104 connected to system bus 106. Also connected to system bus 106 is memory controller/cache 108, which provides an interface to a plurality of local memories 160-163. Remote Input/Output (RIO) hub 110 is connected to system bus 106 and provides an interface to RIO bus 112. Memory controller/cache 108 and RIO hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120-121, 128-129, 136, and 148-149 may be assigned to different logical partitions.

Thus, for example, suppose data processing system 100 is divided into three logical partitions, P1, P2, and P3. Each of I/O adapters 120-121, 128-129, 136, and 148-149, each of processors 101-104, and each of local memories 160-163 is assigned to one of the three partitions. For example, processor 101, memory 160, and I/O adapters 120, 128, and 129 may be assigned to logical partition P1; processors 102-103, memory 161, and I/O adapters 121 and 136 may be assigned to partition P2; and processor 104, memories 162-163, and I/O adapters 148-149 may be assigned to logical partition P3.

Each operating system executing within data processing system 100 is assigned to a different logical partition. Thus, each operating system executing within data processing system 100 may access only those I/O units that are within its logical partition.

RIO to Peripheral component interconnect (PCI) Host bridge 114 connected to I/O bus 112 provides an interface to PCI local bus 115. A number of Input/Output adapters 120-121 may be connected to PCI bus 115 through the use of PCI-PCI bridge 116. Typical PCI-PCI bridge implementations will support between four and eight I/O adapters (i.e. expansion slots for add-in connectors). Each I/O Adapter 120-121 provides an interface between data processing system 100 and input/output devices. An I/O device 120*a* is coupled to I/O adapter 120, and an I/O device 121*a* is coupled to I/O adapter 121.

An additional RIO to PCI host bridge 122 provides an interface for an additional PCI bus 123. PCI bus 123 through the use of PCI-PCI bridge 124 is connected to a plurality of PCI I/O adapters 128-129 by a PCI bus 126-127. An I/O device 128*a* is coupled to I/O adapter 128, and an I/O device 129*a* is coupled to I/O adapter 129.

A memory mapped graphics adapter 148 may be connected to I/O bus 112 through RIO to PCI Host Bridge 140 and PCI-PCI bridge 142 via PCI buses 144 and 145 as depicted. Also, a hard disk 150 may also be connected to RIO bus 112 through RIO to PCI Host Bridge 140 and PCI-PCI bridge 142 via PCI buses 141 and 145 as depicted.

A RIO to PCI host bridge 130 provides an interface for a PCI bus 131 to connect to I/O bus 112. PCI bus 131 connects RIO to PCI host bridge 130 to the service processor mailbox interface and ISA bus access pass-through logic 194 and PCI-PCI bridge 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101-104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101-104, memory controller 108, and RIO hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101-104, memory controller 108, and RIO hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160-163. Service processor 135 then releases the Host processors 101-104 for execution of the code loaded into Host memory 160-163. While the Host processors 101-104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101-104, memories 160-163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs).

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
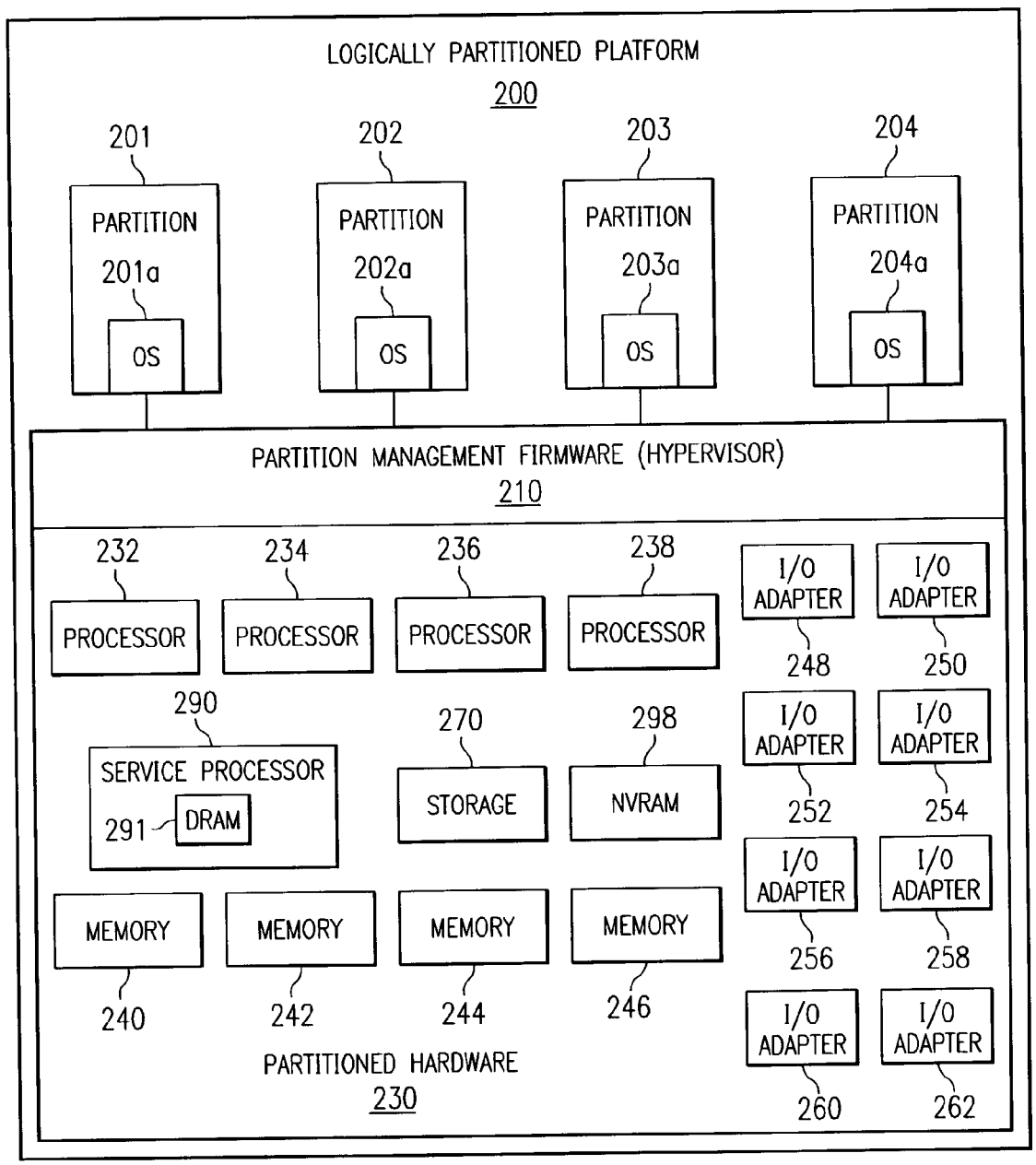
FIG. 3 is a block diagram of an exemplary logically partitioned platform in which the present invention may be implemented.

FIG. 3 is a block diagram of an exemplary logically partitioned platform is depicted in which the present invention may be implemented. Logically partitioned platform 200 includes partitioned hardware 230, partition management firmware, also called a hypervisor, 210, and partitions 201-204. Operating systems 201a-204a exist within partitions 201-204. Operating systems 201a-204a may be multiple copies of a single operating system or multiple heterogeneous operating systems simultaneously run on platform 200.

Partitioned hardware 230 includes a plurality of processors 232-238, a plurality of system memory units 240-246, a plurality of input/output (I/O) adapters 248-262, and a storage unit 270. Each of the processors 242-248, memory units 240-246, NVRAM storage 298, and I/O adapters 248-262 may be assigned to one of multiple partitions 201-204.

Partition management firmware (hypervisor) 210 performs a number of functions and services for partitions 201-204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a-204a either through virtualizing of hardware resources or providing atomic access of shared system resources of logically partitioned platform 200. Hypervisor 210 may attach I/O devices through I/O adapters 248-262 to single virtual machines in an exclusive mode for use by one of OS images 201a-204a.

Figure 4:
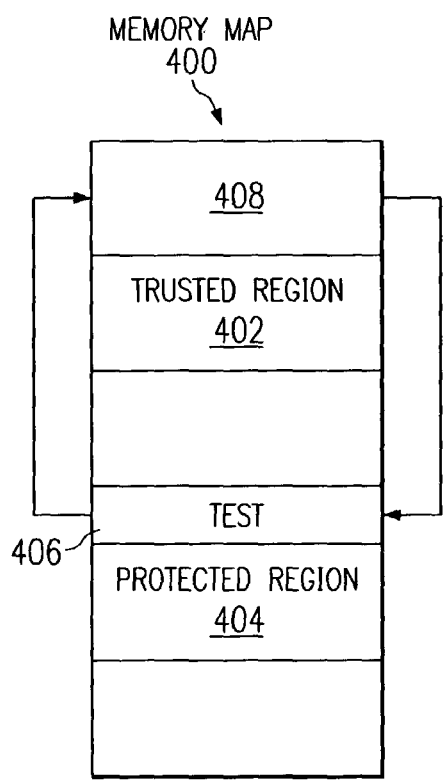
FIG. 4 is a block diagram of a memory map and illustrates a call to an address that is within a protected region in memory from an area that is outside of a trusted region in accordance with the present invention.

FIG. 4 is a block diagram of a map of a memory and illustrates a call to an address within a protected region in memory from an area that is outside of a trusted region in accordance with the present invention. A map 400 is depicted of a memory, such as memory 240, 242, 244, or 246. A region of the memory has been designated as a trusted region 402. A trusted region is defined at link time and cannot be changed. A trusted region is defined by defining a starting memory location and an ending memory location for the trusted region.

In addition, a region of the memory is protected and is designated as a protected region 404. When a call is placed to an address that is within protected region 404, a test routine, stored in test location 406, will intercept the call and determine the origination address of the call. Test location 406 is located within protected region 404. If the call originated from a location that is outside of trusted region 402, such as from region 408, the call will be returned by the test routine without being executed.

Software routines that are to be protected from unauthorized access will be stored within a protected region, such as protected region 404. In this manner, only authorized calls to the protected software routines will be executed. For example, hypervisor code should not be able to be accessed or modified except by authorized code. Thus, if the hypervisor code is stored in a protected memory region, the hypervisor code will not be able to be accessed or modified by rogue calls from outside of the trusted memory region. Rogue calls are defined for the purposes of this application as those calls that originate from a location that is outside of the trusted region of memory.

Figure 5:
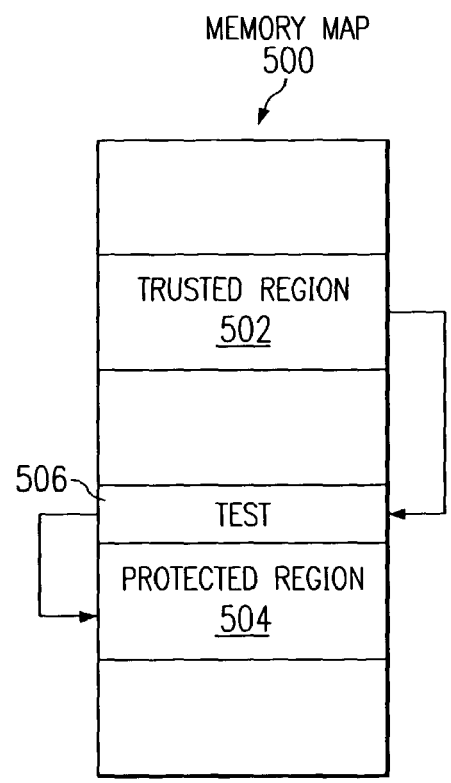
FIG. 5 is a block diagram of a memory map and depicts a call to an address that is within a protected region from inside a trusted region in accordance with the present invention.

FIG. 5 is a block diagram of a memory map and depicts a call to an address that is within a protected region from inside a trusted region in accordance with the present invention. Memory map 500 includes a trusted region 502 and a protected region 504. A test routine is stored in test region 506. Test region 506 is included within protected region 504. When a call is placed to an address that is included within protected region 504, the test routine will intercept the call and determine the origination address of the call. If the call originated from a location that is within trusted region 502, the call will be executed by the test routine forwarding the call to the address within protected region 504.

FIG. 6 illustrates a high level flow chart which depicts storing software routines in a trusted region when the software routine is permitted to access a protected region within memory in accordance with the present invention. The process starts as depicted by block 600 and thereafter passes to block 602 which illustrates designating a particular region of a memory as being a trusted region. A trusted region is designated by specifying a starting memory location and an ending memory location for the trusted region. Thus, the trusted region includes all memory locations in between and including the starting and ending memory locations. Next, block 604 depicts designating a particular region of the memory as being a protected region. A protected region is designated by specifying a starting memory location and an ending memory location for the protected region. Thus, the protected region includes all memory locations in between and including the starting and ending memory locations. The process then passes to block 606 which illustrates the creation of a software routine. Thereafter, block 608 depicts an attempt to store the software routine in the trusted region.

Block 610 illustrates a determination of whether or not the software routine is permitted to access an address of the protected region of the memory. If a determination is made that the software routine is permitted to access an address within the protected region, block 612 depicts the software routine being stored inside the trusted region. Thereafter, the process terminates as illustrated by block 614.

Referring again to block 610, if a determination is made that the software routine is not permitted to access any address within the protected region, the software routine is prohibited from being stored within trusted region. Thereafter, the process terminates as illustrated by block 614.

FIG. 7 depicts a high level flow chart which illustrates executing calls into a protected region only when the call originates from a trusted region in accordance with the present invention. The process starts as depicted by block 700 and thereafter passes to block 702 which illustrates a test routine intercepting a call that was placed to an address within the protected region. Next, block 704 depicts the test routine checking the current value of a link register. A link register is used to store the address which generated the last instruction. Thus, the link register will contain the address which generated the call. The test routine uses the current value of the link register to determine the originating memory address that placed the call.

The process then passes to block 706 which illustrates a determination of whether or not the originating address is located within the trusted region. This determination is made by the test routine. The test routine determines the current value of the link register. If the current value of the link register is between or including the starting and ending memory locations of the trusted region, a determination is made by the test routine that the originating address is located within the trusted region.

Referring again to block 706, if a determination is made that the originating address is located within the trusted region, the process passes to block 708 which depicts the call being executed by forwarding the call to the address within the protected region. The process then passes back to block 702. Referring again to block 706, if a determination is made that the originating address is not located within the trusted region, the process passes to block 710 which illustrates returning control back to the originating memory address without executing the call. The process then passes back to block 702.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for prohibiting unauthorized access to a protected region of memory, said method comprising the steps of:
   specifying a protected region of a memory;
   specifying a trusted region of said memory that is external to said protected region;
   specifying a test portion of said protected region and a protected portion of said protected region;
   storing a test routine in said test portion;
   intercepting, by said test routine, a call that is attempting to access said protected portion;
   determining an origination location of said call; and
   in response to a determination that said origination location is within said trusted region, permitting said call to access said protected portion.

2. The method according to claim 1, further comprising the step of in response to said origination location being outside of said trusted region, prohibiting said call from accessing said protected portion.

3. The method according to claim 1, further comprising the steps of:
   creating a software routine;
   determining whether said software routine is authorized to access said protected portion; and
   in response to a determination that said software routine is authorized to access said protected portion, storing said software routine within said trusted region.

4. The method according to claim 3, further comprising the step of in response to a determination that said software routine is not authorized to access said protected portion, storing said software routine outside of said trusted region.

5. The method according to claim 1, further comprising the steps of:
creating a software routine;
determining whether said software routine is to be protected from being accessed by rogue calls, said rogue calls being calls from a memory location that is outside of said trusted region;
in response to a determination that said software routine is to be protected from being accessed by rogue calls, storing said software routine within said protected portion.

6. The method according to claim 1, further comprising the steps of:
intercepting, by said test routine, all calls that attempt to access any location within said protected portion;
determining, by said test routine, an origination location of each of said calls;
in response to a determination by said test routine that an origination location of a first call, which attempts to access a first location within said protected portion, is within said trusted region, forwarding, by said test routine, said first call to said first location within said protected portion.

7. The method according to claim 6, further comprising the step of in response to a determination by said test routine that an origination location of a first call, which attempts to access a first location within said protected portion, is outside of said trusted region, returning, by said test routine, said first call to said origination location without said first location within said protected portion being accessed.

8. The method according to claim 1, further comprising the steps of:
creating hypervisor code for performing hypervisor functions; and
storing said hypervisor code within said protected portion.

9. The method according to claim 1, further comprising the step of determining an origination location of said call by determining a current value of a link register, said current value of said link register being a memory location from which said call originated.

10. The method according to claim 1, further comprising the step of specifying a trusted region by specifying a starting memory location and an ending memory location, said trusted region including all memory locations from and including said starting memory location through and including said ending memory location.

11. The method according to claim 1, further comprising the step of specifying a protected portion by specifying a starting memory location and an ending memory location, said protected portion including all memory locations from and including said starting memory location through and including said ending memory location.

12. The method according to claim 1, further comprising the steps of:
specifying a trusted region by specifying a starting memory location and an ending memory location, said trusted region including all memory locations from and including said starting memory location through and including said ending memory location;
determining an origination location of said call by determining a current value of a link register, said current value of said link register being a memory location from which said call originated;
determining whether said memory location from which said call originated is between said starting memory location and said ending memory location;
in response to a determination that said memory location from which said call originated is between said starting memory location and said ending memory locations determining that said memory location from which said call originated is within said trusted region of memory and permitting said call to access said protected portion; and
in response to a determination that said memory location from which said call originated is not between said starting memory location and said ending memory location, determining that said memory location from which said call originated is outside of said trusted region and prohibiting said call from accessing said protected portion.

13. A data processing system for prohibiting unauthorized access to a protected region of memory, comprising:
a protected region of a memory that includes a protected portion and a test portion;
a trusted region of the memory that is external to said protected region;
a test routine stored in said test portion;
said test routine intercepting a call that is attempting to access said protected portion;
said system including a CPU executing code for determining an origination location of said call; and
in response to a determination that said origination location is within said trusted region, said CPU executing code for permitting said call to access said protected portion.

14. The system according to claim 13, further comprising in response to said origination location being outside of said trusted region, said CPU executing code for prohibiting said call from accessing said protected portion.

15. The system according to claim 13, further comprising:
a software routine;
said CPU executing code for determining whether said software routine is authorized to access said protected portion; and
in response to a determination that said software routine is authorized to access said protected portion, said software routine being stored within said trusted region.

16. The system according to claim 15, further comprising in response to a determination that said software routine is not authorized to access said protected portion, said software routine being stored outside of said trusted region.

17. The system according to claim 13, further comprising:
a software routine;
said CPU executing code for determining whether said software routine is to be protected from being accessed by rogue calls, said rogue calls being calls from a memory location that is outside of said trusted region;
in response to a determination that said software routine is to be protected from being accessed by rogue calls, said software routine being stored within said protected portion.

18. The system according to claim 13, further comprising:
said test routine intercepting all calls that attempt to access any location within said protected portion;
said test routine determining an origination location of each of said calls;
in response to a determination by said test routine that an origination location of a first call, which attempts to access a first location within said protected portion, is within said trusted region, said test routine forwarding said first call to said first location within said protected portion.

19. The system according to claim 18, further comprising in response to a determination by said test routine that an origination location of a first call, which attempts to access a first location within said protected portion, is outside of said trusted region, said test routine returning said first call to said origination location without said first location within said protected portion being accessed.

20. The system according to claim 13, further comprising:
hypervisor code for performing hypervisor functions; and
said hypervisor code being stored within said protected portion.

21. The system according to claim 13, further comprising the step of determining an origination location of said call by determining a current value of a link register, said current value of said link register being a memory location from which said call originated.

22. The system according to claim 13, further comprising a trusted region, said trusted region being specified by specifying a starting memory location and an ending memory location, said trusted region including all memory locations from and including said starting memory location through and including said ending memory location.

23. The system according to claim 13, further comprising a protected portion, said protected portion being specified by specifying a starting memory location and an ending memory location, said protected portion including all memory locations from and including said starting memory location through and including said ending memory location.

24. The system according to claim 13, further comprising:
a trusted region, said trusted region being specified by specifying a starting memory location and an ending memory location, said trusted region including all memory locations from and including said starting memory location through and including said ending memory location;
said CPU executing code for determining an origination location of said call by determining a current value of a link register, said current value of said link register being a memory location from which said call originated;
said CPU executing code for determining whether said memory location from which said call originated is between and including said starting memory location and said ending memory location;
in response to a determination that said memory location from which said call originated is between said starting memory location and said ending memory location, said CPU executing code for determining that said memory location from which said call originated is within said trusted region and permitting said call to access said protected portion; and
in response to a determination that said memory location from which said call originated is not between and including said starting memory location and said ending memory location, said CPU executing code for determining that said memory location from which said call originated is outside of said trusted region of memory and prohibiting said call from accessing said protected portion.

25. A computer program product. which is stored in a computer readable medium, in a data processing system for prohibiting unauthorized access to a protected region of memory, comprising:

instruction means for specifying a protected region of a memory;
instruction means for specifying a trusted region of said memory that is external to said protected region;
instruction means for specifying a test portion of said protected region and a protected portion of said protected region;
instruction means for storing a test routine in said test portion;
instruction means for intercepting, by said test routine, a call that is attempting to access said protected portion;
instruction means for determining an origination location of said call; and
in response to a determination that said origination location is within said trusted region, instruction means for permitting said call to access said protected portion.

26. The product according to claim 25, further comprising in response to said origination location being outside of said trusted region, instruction means for prohibiting said call form accessing said protected portion.

27. The product according to claim 25, further comprising:
instruction means for creating a software routine;
instruction means for determining whether said software routine is authorized to access said protected portion; and
in response to a determination that said software routine is authorized to access said protected portion, instruction means for storing said software routine within said trusted region.

28. The product according to claim 27, further comprising in response to a determination that said software routine is not authorized to access said protected portion, instruction means for storing said software routine outside of said trusted region.

29. The product according to claim 25, further comprising:
instruction means for creating a software routine;
instruction means for determining whether said software routine is to be protected from being accessed by rogue calls, said rogue calls being calls from a memory location that is outside of said trusted region;
in response to a determination that said software routine is to be protected from being accessed by rogue calls, instruction means for storing said software routine within said protected portion.

30. The product according to claim 25, further comprising:
instruction means for intercepting, by said test routine, all calls that attempt to access any location within said protected portion;
instruction means for determining, by said test routine, an origination location of each of said calls;
in response to a determination by said test routine that an origination location of a first call, which attempts to access a first location within said protected portion, is within said trusted region, instruction means for forwarding, by said test routine, said first call to said first location within said protected portion.

31. The product according to claim 30, further comprising in response to a determination by said test routine that an origination location of a first call, which aftempts to access a first location within said protected portion, is outside of said trusted region, instruction means for returning, by said test routine, said first call to said origination location without said first location within said protected portion being accessed.

32. The product according to claim 25, further comprising:
- instruction means for creating hypervisor code for performing hypervisor functions; and
- instruction means for storing said hypervisor code within said protected portion.

33. The product according to claim 25, further comprising instruction means for determining an origination location of said call by determining a current value of a link register, said current value of said link register being a memory location from which said call originated.

34. The product according to claim 25, further comprising instruction means for specifying a trusted region by specifying a starting memory location and an ending memory location, said trusted region including all memory locations from and including said starting memory location through and including said ending memory location.

35. The product according to claim 25, further comprising instruction means for specifying a protected portion by specifying a starting memory location and an ending memory location, said protected portion including all memory locations from and including said starting memory location through and including said ending memory location.

36. The product according to claim 25, further comprising:
- instruction means for specifying a trusted region by specifying a starting memory location and an ending memory location, said trusted region including all memory locations from and including said starting memory location through and including said ending memory location;
- instruction means for determining an origination location of said call by determining a current value of a link register, said current value of said link register being a memory location from which said call originated;
- instruction means for determining whether said memory location from which said call originated is between and including said starting memory location and said ending memory location;
- in response to a determination that said memory location from which said call originated is between said starting memory location and said ending memory location, instruction means for determining that said memory location from which said call originated is within said trusted region and permitting said call to access said protected portion; and
- in response to a determination that said memory location from which said call originated is not between and including said starting memory location and said ending memory location, instruction means for determining that said memory location from which said call originated is outside of said trusted region and prohibiting said call from accessing said protected portion.

* * * * *